United States Patent [19]
Bailey

[11] Patent Number: 5,093,610
[45] Date of Patent: Mar. 3, 1992

[54] APPARATUS FOR ABSOLUTE POSITION MEASUREMENT

[75] Inventor: Edward J. Bailey, Greenwood, S.C.

[73] Assignee: ABB Robotics Inc., New Berlin, Wis.

[21] Appl. No.: 478,868

[22] Filed: Feb. 12, 1990

[51] Int. Cl.⁵ .............................................. G05B 1/06
[52] U.S. Cl. ................................. 318/661; 318/602; 318/625; 318/561
[58] Field of Search .................. 318/560–660; 388/810–830; 310/112, 83; 324/160–180

[56] References Cited

U.S. PATENT DOCUMENTS

| | | | |
|---|---|---|---|
| 3,054,304 | 9/1962 | Jursik et al. | 318/595 |
| 3,160,803 | 12/1964 | White | 318/608 |
| 3,936,060 | 2/1976 | Hirao | 318/603 X |
| 4,207,504 | 6/1980 | Kawada et al. | 318/561 |
| 4,342,950 | 8/1982 | Kohzai et al. | 318/561 X |
| 4,345,192 | 8/1982 | Kohzai et al. | 318/653 X |
| 4,347,470 | 8/1982 | Kohzai et al. | 318/594 X |
| 4,359,676 | 11/1982 | Fujioka | 318/653 |
| 4,379,987 | 4/1983 | Kohzai et al. | 318/561 |
| 4,398,138 | 8/1983 | Kohzai et al. | 318/561 X |
| 4,450,393 | 5/1984 | Kohzai et al. | 318/653 X |
| 4,480,506 | 11/1984 | Chapman | 219/69.2 X |
| 4,501,999 | 2/1985 | Kohzai et al. | 318/632 |
| 4,575,666 | 3/1986 | Nakashima et al. | 318/661 |
| 4,580,209 | 4/1986 | Hohn et al. | 364/182 |
| 4,647,827 | 3/1987 | Toyoda et al. | 318/625 X |
| 4,827,203 | 5/1989 | Sakano | 318/601 X |

*Primary Examiner*—Paul Ip
*Attorney, Agent, or Firm*—John W. Gregg; Paul J. Lerner

[57] ABSTRACT

An apparatus for measurement of absolute position of a movable machine member is provided. The machine member is moved by a motor and reduction device producing rotation of the machine member in proportion to relative rotation of the motor rotor and motor stator. Two angular position measuring devices provide output signals representing relative positions related to the machine member position and differentiated one from another.

6 Claims, 1 Drawing Sheet

APPARATUS FOR ABSOLUTE POSITION MEASUREMENT

BACKGROUND OF THE INVENTION

1. Field of the Invention

This invention relates to measurement of position of movable machine members. In particular, this invention relates to measurement of absolute position of movable machine members using two angular position measuring devices.

2. Description of the Prior Art

It is known to use two angular position measuring devices, for example, resolvers, to measure absolute position of a movable machine member. A particular known technique is to rotate the resolver rotors through a transmission to produce slightly different rotations of the rotors relative to one another. For example, if the rotor of one resolver is driven at a ratio of N to the angular position being measured, the rotor of the other resolver is driven at a ratio of (N +1). The differential ratios in transmission are chosen to assure that the difference of angular position as measured by the resolvers is unique throughout the range of motion of the machine member.

Such known position measuring systems have the disadvantage of requiring special transmissions for the express purpose of driving the resolver rotors. And, while it is known to provide position measuring units incorporating the resolvers and the required transmission components the cost of such units may be prohibitive because of the cost of manufacturing the transmission components. Further, the use of such transmissions introduces the inherent inaccuracies of the transmission components in the measurement of position.

SUMMARY OF THE INVENTION

It is an object of the present invention to provide measurement of position of a movable machine member driven by a motor and reduction drive using two angular position measuring devices producing output signals representing relative angular positions which are related to the position of the machine member and differentiated one from another.

It is a further object of the present invention to provide for measurement of absolute position of a movable machine member, the motion of the member being imparted by a drive motor and reduction device, the absolute position of the machine member being measured using first and second angular position measuring devices each having a rotor and a stator, one of the rotor and stator of the first device being commonly driven with one of the rotor and stator of the second device by the one of the motor rotor and motor stator driving the reduction device, the other remaining stationary relative to the machine member, and one of the rotor and stator of the second device rotating with the machine member.

Further objects and advantages of the present invention shall become apparent from the accompanying drawing and the description thereof.

DETAILED DESCRIPTION OF A PREFERRED EMBODIMENT

Figure 1:
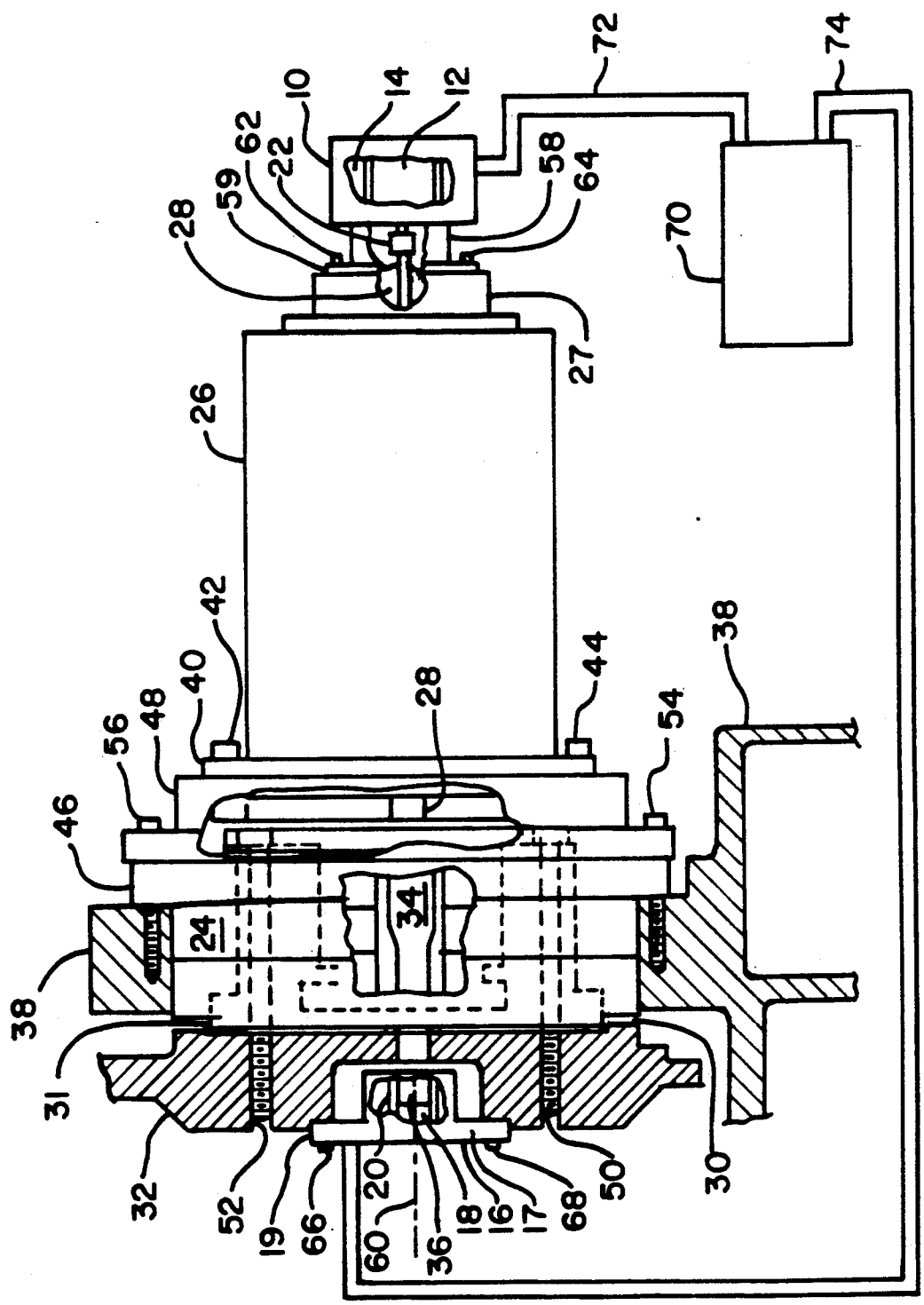
FIG. 1 shows a movable machine member and associated drive in accordance with the present invention.

To illustrate the invention, a detailed description of a preferred embodiment shall be provided. The preferred embodiment corresponds to a construction incorporated in certain industrial robots manufactured by Cincinnati Milacron Inc., the assignee of the present invention.

FIG. 1 shows certain drive elements at a shoulder joint of an industrial manipulator. An upper arm 32 (a portion of which is shown in cross-section in FIG. 1) is rotated about an axis 60 by a drive motor 26 supported by a machine base 38, the portion of base 38 shown in FIG. 1 appearing in cross-section. An epitrochoidal drive is used as a reduction device 30 between the upper arm 32 and the motor 26 and includes an input shaft 34 driven by motor 26. The input shaft 34 is viewed through the cut-away of case 24. The epitrochoidal drive chosen by applicant is an RV series drive available from Teijin Seiki Co., Ltd. The reduction device 30 produces rotation of output member 31 in proportion to rotation of input shaft 34. Consequently, as applied at the shoulder joint the upper arm 32 makes one rotation for every N rotations of input shaft 34.

Continuing with reference to FIG. 1., motor rotor 28, which is viewed through the cut away in the bell housing 48, is inserted into the end of input shaft 34 and connected thereto by a key (not shown). The upper arm 32 is connected to the output member 31 by a combination of pins 50 and bolts 52. A flange 46 formed in the case 24 of the reduction drive 30 is mounted to the machine base 38 by a combination of pins 56 and bolts 54 which pass through a flange in housing 48. The motor 26 is mounted to bell housing 48 by the motor mount flange 40 using bolts 42 and 44. By virtue of this mounting arrangement, case 24 and motor case 27 are stationary relative to the upper arm 32.

Absolute angular position of the upper arm 32 is determined from relative angular positions measured by resolvers 10 and 16. The rotor 12 of resolver 10 is coupled to motor rotor 28, by coupling 22 shown in the cut away of the housing 58. The motor rotor 28 is viewed through the cut-away at the extreme right end of motor case 27. Resolver stator 14 of resolver 10 is rigidly mounted to housing 58 which is mounted to the motor case 27 by a mounting flange 59 using bolts 62 and 64. Consequently, the stator 14 of resolver 10 is stationary relative to upper arm 32. The rotor 18 of resolver 16 is shown in the cut.away of the resolver housing 17 and is driven by input shaft 34 of reduction device 30 by means of a key (not shown) mated to shaft extension 36. Resolver housing 17 is mounted to upper arm 32 by mounting flange 19 using bolts 66 and 68 and stator 20 of resolver 16 is fixed relative to housing 17. Therefore, stator 20 rotates with upper arm 32

DESCRIPTION OF OPERATION

As is conventional, the resolvers 10 and 16 produce phase shift of output signals relative to input signals as a function of the angular displacement of the resolver rotors relative to the resolver stators. An interface circuit 70 provides input signals to the resolver rotors and receives the output signals from the resolver stators via connecting cables 72 and 74. Applicant has chosen to use brushless resolvers which provide inductive coupling of signals between the resolver rotors and resolver stators to produce output signals from the input signals.

The output signals of resolver 10 give a direct indication of the angular position of motor rotor 28 by virtue of the coupling of resolver rotor 12 to motor rotor 28 and the fixed attachment of resolver stator 14 to the motor case 27. Where the output member 31 signals of resolver 16 measure (N −1) rotations of the motor rotor, that is, the difference between the rotations of resolver rotor 18, driven by motor rotor 28, and the rotation of the resolver stator 20 driven by upper arm 32. The angular positions reflected in the output signals of the resolvers 10 and 16 are, therefore, in the ratio of N to (N −1). If the reduction device 30 produced rotation of output member 31 in a direction opposite to that of input shaft 34 the output signals of resolver 16 would measure (N +1) rotations of the motor rotor. In that case, the angular positions represented by the output signals of the resolvers 10 and 16 would be in the ratio of N to (N+1). Because the difference in the measured positions of resolver 10 and resolver 16 is unique throughout the full range of motion of upper arm 32, the absolute angular position of upper arm 32 can be determined at any time by known techniques of manipulation of the position signals derived from the resolvers 10 and 16. See, for example, U.S. Pat. No. 4,580,209.

While the preferred embodiment has been described in considerable detail, it is not intended to in any way limit the applicability of the invention by the details of the preferred embodiment. It is recognized in particular that other angular position measuring devices may be used in place of the resolvers of the preferred embodiment, such as, for example, encoders. And further, it is recognized that alternative reduction devices may be substituted for the device described with respect to the preferred embodiment. For example, in instances where a comparatively high ratio of reduction is desired, a harmonic drive may be used, or in other applications, a conventionally geared transmission may be appropriate. Other suitable reduction devices will be recognized by those skilled in the art. Further, other arrangements for mounting the angular position measuring devices, the drive motor and the reduction device will suggest themselves to those skilled in the art. It will also be recognized that the arrangement described herein may advantageously be used with other members of an industrial robot including, without limitation, other arm members as well as wrist and hand members. It is the intention of applicant that the invention cover all modifications, alterations, and equivalents falling within the spirit and scope of the appended claims.

The invention claimed is:

1. An apparatus for producing an absolute position signal having a unique value for all positions of a rotating machine member, the machine member being moved by a motor and a reduction device, the motor having a motor rotor and a motor stator, the reduction device having an input shaft fixed to the motor rotor, a housing fixed to the motor stator and having an output shaft fixed to the rotating machine member, the apparatus comprising:

a. a first angular position measuring device comprising a first rotor and a first stator, said first stator being fixed to the motor stator and said first rotor being fixed to the motor rotor, said first angular position measuring device producing first output signals indicative of the relative rotational angle of the motor rotor and the motor stator;

b. a second angular position measuring device comprising a second rotor and a second stator, said second rotor being fixed to the motor rotor, said second stator being fixed to the rotating machine member, said second angular position measuring device producing second output signals indicative of the relative rotational position of the motor rotor and the rotating machine member; and c. means responsive to said first and second output signals for producing absolute position signals representing the absolute position of the machine member anywhere within its full range of motion.

2. The apparatus of claim 1 wherein at least one of said first and second angular position measuring devices is a resolver.

3. The apparatus of claim 1 wherein the speed reduction device is a harmonic drive.

4. The apparatus of claim 1 wherein the speed reduction device is a epitrochiodal drive.

5. The apparatus of claim 1 wherein the speed reduction device is a gear train.

6. The apparatus of claim 1 wherein at least one of said first and second angular position measuring devices is an encoder.

* * * * *